(12) United States Patent
Bailey

(10) Patent No.: US 9,529,419 B2
(45) Date of Patent: Dec. 27, 2016

(54) METHODS AND APPARATUSES FOR SWITCH POWER DOWN

(71) Applicant: Broadcom Corporation, Irvine, CA (US)

(72) Inventor: Stephen Wilson Bailey, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 589 days.

(21) Appl. No.: 13/893,743

(22) Filed: May 14, 2013

(65) Prior Publication Data

US 2014/0289544 A1 Sep. 25, 2014

Related U.S. Application Data

(60) Provisional application No. 61/804,116, filed on Mar. 21, 2013.

(51) Int. Cl.
*G06F 1/32* (2006.01)

(52) U.S. Cl.
CPC .............. *G06F 1/3296* (2013.01); *G06F 1/324* (2013.01); *G06F 1/3278* (2013.01); *G06F 1/3287* (2013.01); *Y02B 60/126* (2013.01); *Y02B 60/1217* (2013.01); *Y02B 60/1282* (2013.01); *Y02B 60/32* (2013.01)

(58) Field of Classification Search
CPC ...... G06F 1/324; G06F 1/3278; G06F 1/3287; G06F 1/3296; Y02B 60/1217; Y02B 60/126; Y02B 60/1282; Y02B 60/32
See application file for complete search history.

(56) References Cited

U.S. PATENT DOCUMENTS

| | | | |
|---|---|---|---|
| 7,483,370 B1 * | 1/2009 | Dayal | G06F 11/2038 370/219 |
| 7,640,446 B1 * | 12/2009 | Donovan | G06F 1/08 710/107 |
| 7,734,942 B2 * | 6/2010 | Dahlen et al. | 713/323 |
| 7,809,969 B2 * | 10/2010 | Das Sharma | G06F 1/3203 710/305 |
| 8,181,055 B2 * | 5/2012 | Zhao et al. | 713/340 |
| 8,188,766 B1 * | 5/2012 | Cheah et al. | 326/93 |
| 8,201,005 B2 * | 6/2012 | Wertheimer et al. | 713/323 |
| 8,650,421 B2 * | 2/2014 | Yu et al. | 713/321 |
| 8,811,208 B2 * | 8/2014 | Johnsson | H04L 41/0833 370/252 |
| 9,092,223 B1 * | 7/2015 | Pani | G06F 1/3209 |

\* cited by examiner

*Primary Examiner* — Thuan Du
(74) *Attorney, Agent, or Firm* — Brinks Gilson & Lione

(57) ABSTRACT

The discussion makes reference to methods and apparatuses for message-driven switch power, power control, and central processing unit (CPU)-assisted full switch power-down. The link layer in computer networking can be used to save power in switching elements.

20 Claims, 7 Drawing Sheets

METHODS AND APPARATUSES FOR SWITCH POWER DOWN

PRIORITY CLAIM

This application claims priority to U.S. Provisional Application Ser. No. 61/804,116, filed Mar. 21, 2013, which is incorporated herein by reference in its entirety.

TECHNICAL FIELD

This disclosure relates to methods and apparatuses for network controlled computer power down, energy efficient driven switch power, power control, and/or central processing unit assisted full switch power-down.

BACKGROUND

Energy-Efficient Ethernet (EEE) is a set of enhancements to the Ethernet family of computer networking standards that allow for less power consumption during periods of low data activity. The intention is to reduce power consumption while retaining compatibility with existing equipment. The Institute of Electrical and Electronics Engineers (IEEE), through the IEEE 802.3az task force developed the standard.

To save energy, in 100 Mbit/s and faster Ethernet data links can be put into sleep mode when no data is being sent. By sending a low-power-idle (LPI) indication signal for a specified time the transmit chips in the system can be turned off. LPI is sent periodically to refresh the sleep mode. When there is data to transmit a normal idle signal can be sent to wake the transmit system. The data link layer is considered to be always operational, as the receive signal circuit remains active even when the transmit path is in sleep mode.

BRIEF DESCRIPTION OF THE DRAWINGS

The innovation may be better understood with reference to the following drawings and description. In the figures, like reference numerals can designate corresponding parts throughout the different views.

DETAILED DESCRIPTION

The discussion makes reference to methods and apparatuses for network controlled computer power down, message-driven switch power, power control, and central processing unit (CPU)-assisted full switch power-down. The link layer in computer networking can be used to save power in switching elements and computers.

Figure 1:
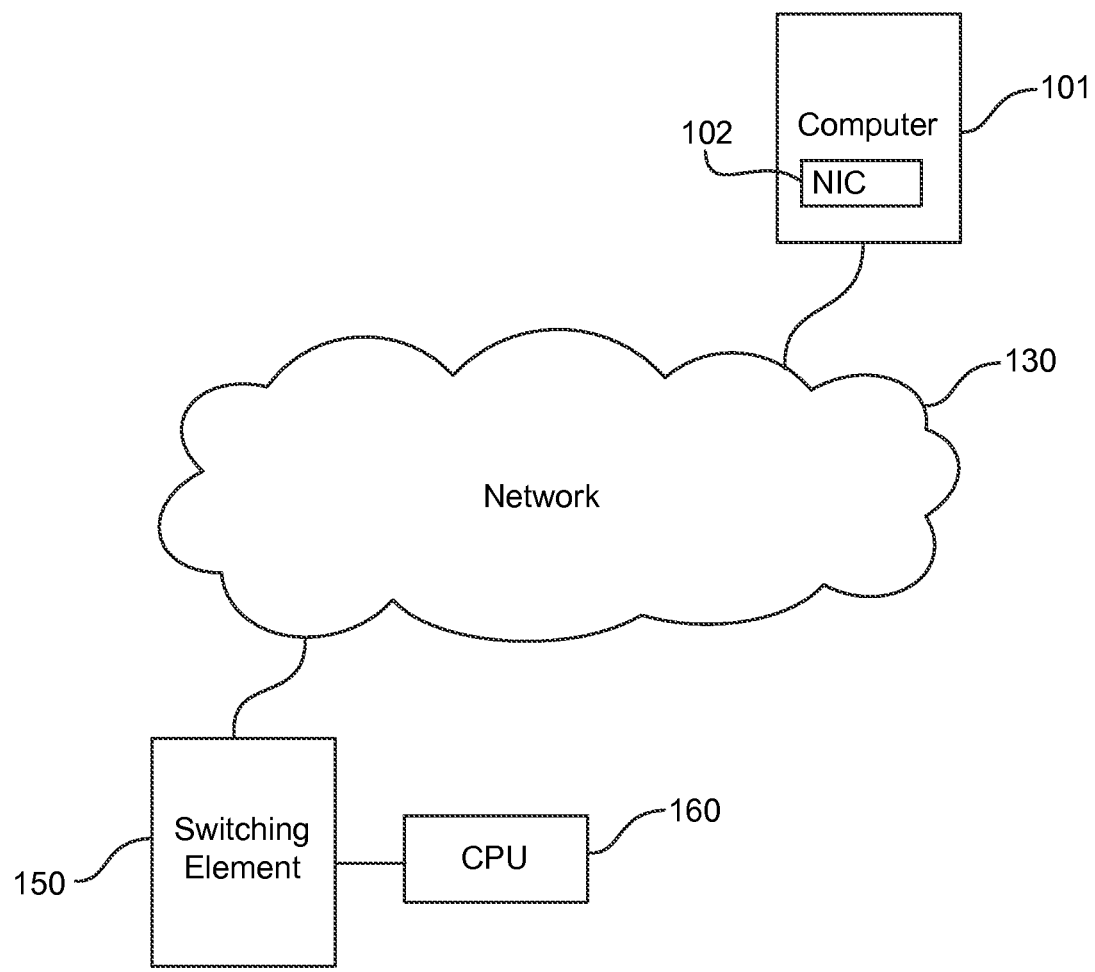
FIG. 1 is a block diagram of an exemplary network system.

FIG. 1 is a block diagram of an exemplary network system 100. The network system 100 can include a computer 101 connected to a communication network 130, e.g., data center network, via a network interface card (NIC) 102 and a switching element 150 connected to computers 101 and the network 130. Status messages received from the network 130 and computers 101 regarding a state of the network activity can be used control power to the switching element 150.

Figure 2:
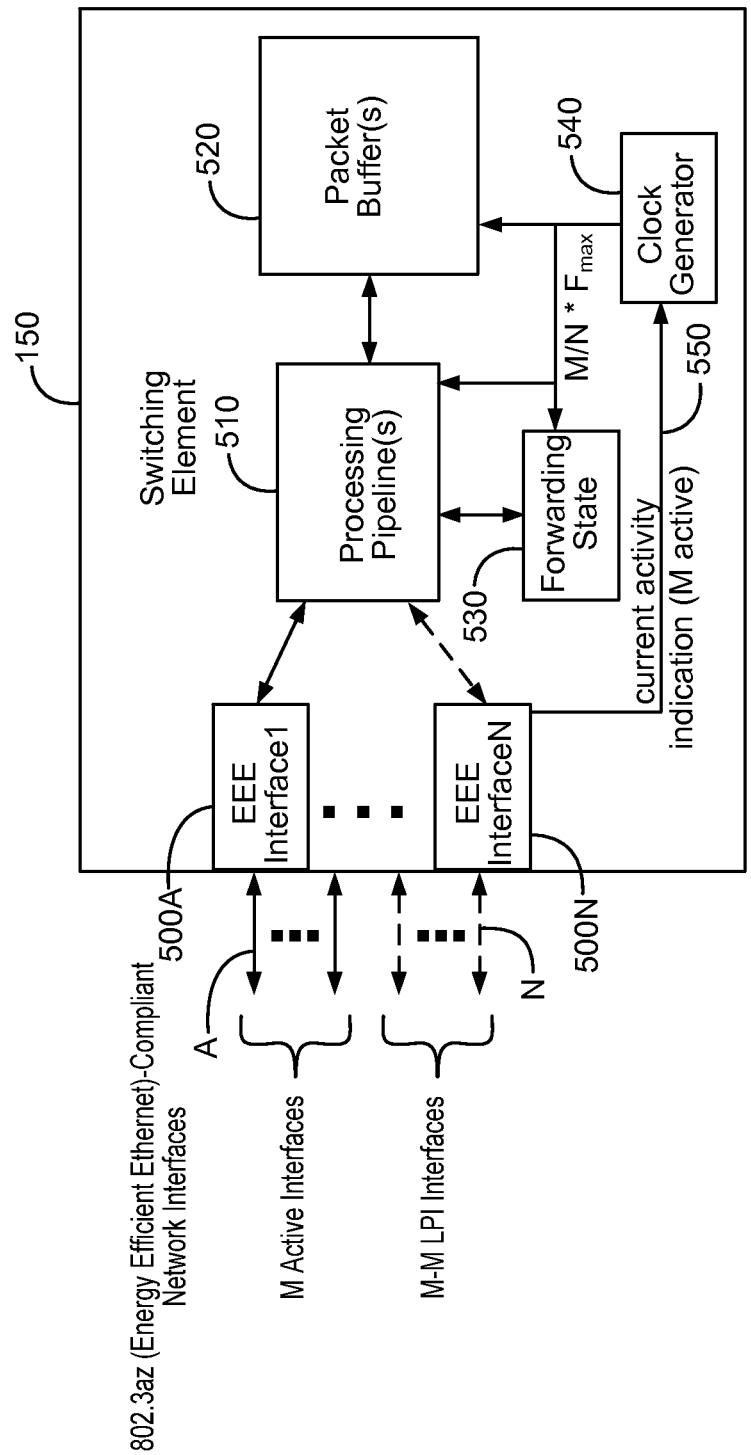
FIG. 2 is a block diagram of a switching element of the exemplary network system that can reduce dynamic power consumption.

FIG. 2 is a block diagram of a switching element 150 of the exemplary network system 100 that can reduce dynamic power consumption. Leveraging the IEEE 802.3az (EEE) LPI state on one or more port interfaces of a network switch can be used for power reduction beyond PHY-layer interface power savings by reducing the processing throughput and disabling some switching functions based on the number of interfaces operating in the idle, e.g., EEE LPI, state. Techniques to achieve EEE-driven switch power control include reducing the frequency of switch processing pipelines and packet buffers proportionally to the number of interfaces in the LPI state to save dynamic power of the processing pipeline and packet buffer. Also, as described in more detail in FIG. 3, turning off a switch processing pipelines and packet buffers when all associated interfaces enter the LPI state can save both dynamic and static power of the processing pipeline and packet buffer.

In FIG. 2, the switching element 150 can include a plurality of 1 to N interfaces 500A-N to support A through N ports connected with one or more processing pipelines 510. The processing pipeline 510 can connect to one or more packet buffers 520 and a forwarding state generator 530. The packet buffer 520 can store data packets being sent to and received from the switching element 150. A timing of the processing pipeline 510, packet buffer 520 and forwarding state 530 can be controlled by a clock generator 540. The interfaces 500A-N can send to the clock generator 540 an indication 550 of how many of the interfaces 500A-N need to be active for the current traffic on the network 130. If M interfaces are active, M minus N interfaces are inactive and the full speed of the switching element 150 may not be necessary for acceptable operation.

When one or more of the interfaces 500A-N of the switching element 150 are determined to be in an inactive or idle state, a frequency of the switch data path including the processing pipeline 510, packet buffer 520 and forwarding state 530 can be reduced. For example, if half of the interfaces 500A-N are inactive on the switching element 150, the clock generator frequency can be lowered from 100 MHz to 50 MHz. Other speeds can be used. The idle state indicates that packets from the network 130 are not currently destined for that interface 500A-M. In one example, the frequency can be reduced proportionally to the number of inactive interfaces 500A-N to dynamically save switching power consumption.

The idle state of interfaces 500A-N can be determined for those interfaces 500A-N that are receiving idle messages, e.g., an IEEE 802.3az EEE idle message from the network 130. The maximum frequency $F_{max}$ can be reduced when any of interfaces 500A-N are operating in the idle state. If the $F_{max}$ frequency is determined as the frequency of the clock generator 540 for full throughput on all N interfaces 500A-N, an adjusted frequency can be determined as $M/N*F_{max}$. As the speed of the switching element 150 slows it can consume less power to save power. In other examples, one or more discrete frequency adjustments, e.g. ($0*F_{max}$, $½*F_{max}$, $1*F_{max}$) can be utilized instead of the ratio $M/N*F_{max}$ for a possibly simpler circuit. Additionally or alternatively, the frequency can be adjusted for only a controlled subset instead of the full set of the pipeline 510, forwarding state 530 and packet buffer 520, for a possibly simpler circuit.

Figure 3:
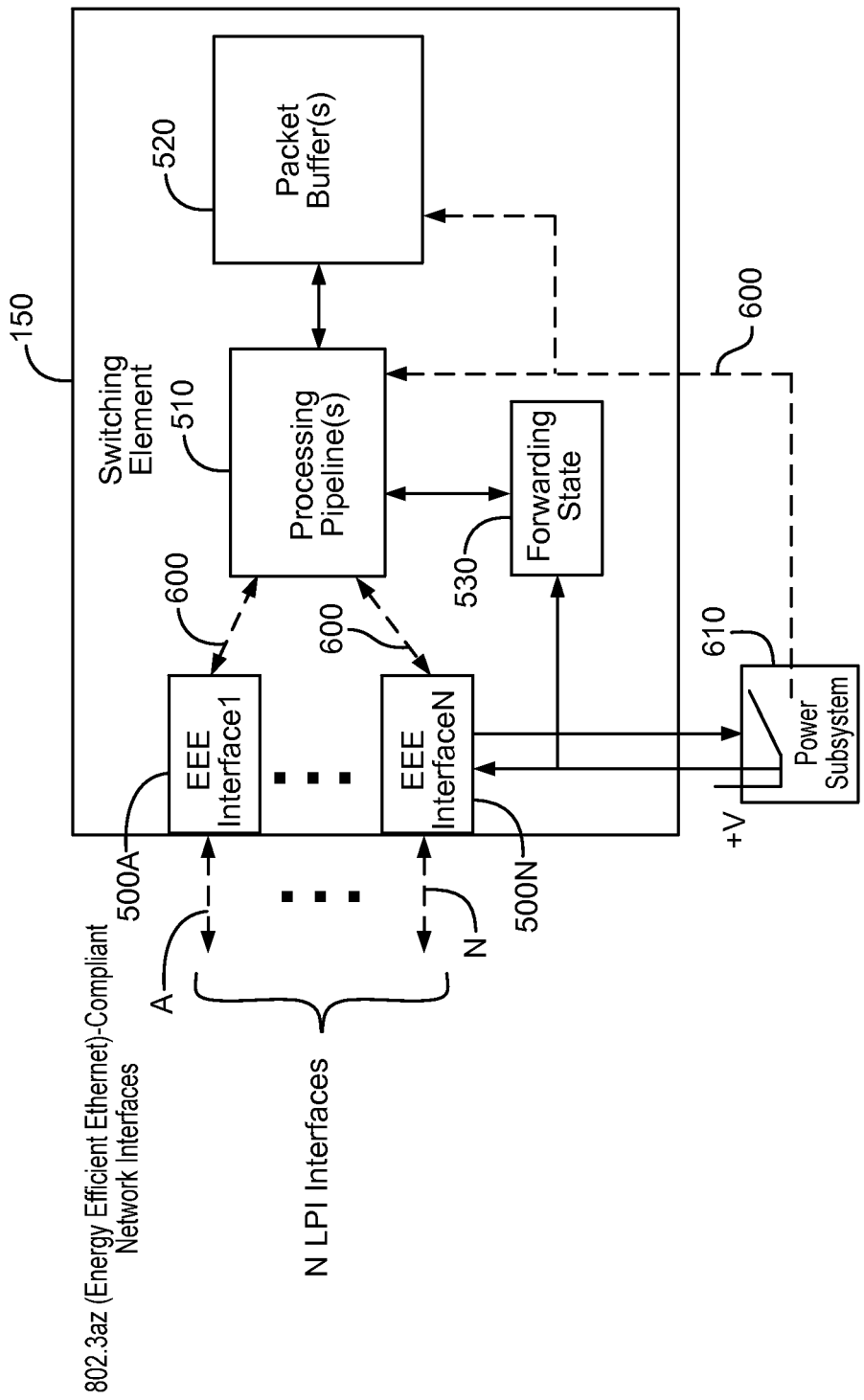
FIG. 3 is a block diagram of a switching element of the exemplary network system that can reduce static power consumption.

FIG. 3 is a block diagram of a switching element of the exemplary network system that can reduce static power consumption. When all the port interfaces 500A-N impinging upon a discrete data path 600 are idle, the entire data path 600 can be turned off, saving static leakage power in addition to dynamic power. The data path 600 can include the processing pipeline 510, packet buffer 520 and forwarding state 530. A power subsystem switch 610 can connect to the interfaces 500A-N to detect when all the interfaces 500A-N for the data path 600 are receiving an idle message from the network 130. The power subsystem switch 610 can switch off power to the data path 600 when the interfaces 500A-N are idle. Additionally or alternatively, before turning off power the power subsystem switch 610 can also determine that no packets are currently being processed. The forwarding state 530 can remain powered.

Switching off power to the data path 600 can completely power-down portions of the switching element logic and reduce operating frequency to direct current (DC) to save dynamic power. Individual pipelines and packet buffers can be powered down when connected to a subset of interfaces 500A-N that are presently in the idle state. An IEEE 802.3az hold time interval message can be used to initiate restoring power to the data path 600 before the data packets are due to be sent so that packets are not lost. For example, when the power subsystem switch 610 detects the hold time message, which occurs before the network becomes active to the interfaces 500A-N, the power subsystem switch 610 can close to supply power to the processing pipeline 510 and packet buffer 520. The idle and/or turn-on time to power up, or speed up the processing pipeline can be configured based on an implementation. The turn on or speed up times can be determined to ensure that no packets are lost at the switching element before powering up from the power down or a slowed clock speed.

Frequency scaling can be detected by estimating the per-port power savings for PHY-only idle power-down. The power of a switching device with all links active can be measured. Each link can be placed into its idle state, e.g. 803.3az LPI state. The power after each additional link enters the idle state can be measured. If the measured power when one or more links is in an idle state is less than the all-active power minus the PHY-only power savings then the dynamic frequency scaling invention is in use. The granularity of frequency scaling may not be per-port. For example, there may only be full-speed and half-speed options implemented. The entire range of idle ports (0-n) can be tested to detect the frequency scaling.

It also may be possible to measure the core pipeline clock generator 540 with some form of antenna connected to a frequency analyzer and observe the core clock reduction as ports enter the idle state. The static power savings portion of the invention can be detected such that if the power savings when placing all ports in an idle is much more than without it then the static power savings, e.g., idle-driven data path power-down, is in use. It may also be possible to detect the complete power-down of sections of the chip either by using some form of heat-detection, e.g. IR imaging, on the chip die or package or by observing a significant power on/off transient on the chip power supply.

The power control to the switching element 150 can be used in a range of network switching systems, including managed and unmanaged switches, routers, gateways and firewalls. The processing functions that are scaled and disabled may take any form, including CPU-based functions, digital signal processing that may operate on the network data, field programmable gate arrays (FPGAs), hard-coded functions and network processors. The power subsystem 610 can resupply power to the processing pipeline 510 and the packet buffer 520 when at least one interface of the interfaces 500A-N receives a hold state message.

Figure 4:
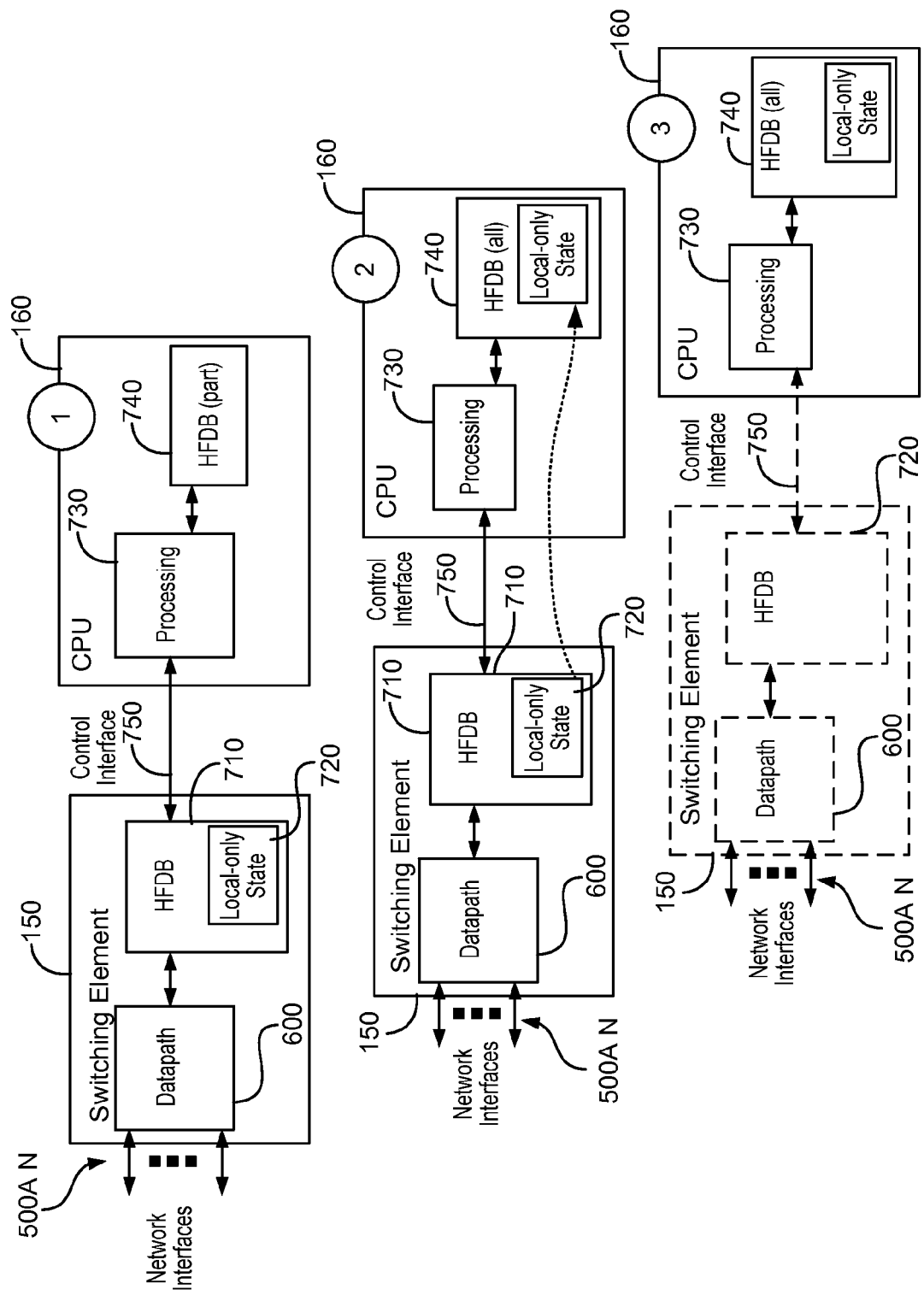
FIG. 4 is a block diagram of an exemplary full power down of the switching element as assisted by the central processing unit.

FIG. 4 is a block diagram of an exemplary full power down of the switching element 150 as assisted by the CPU 160 for managing the switching element 150. The switching element 150 can include a data path 600 connected with a hardware forwarding database (HFDB) 710 which can store a state indicating packet forwarding information, e.g., forwarding information base (FIB), for packets being processed by the switching element 150. Typically, when functions of a network switch are powered down during idle periods, the HFDB 710 remains powered on to ensure correct forwarding of packets following the idle period.

The CPU 160, which can be used to control the switching element 150, includes a processing element 730 and a CPU copy 740 of the HFDB 710 stored in memory. At stage 1, the CPU copy 740 of the HFDB 710 can include a complete or a partial copy of the HFDB 710. If the CPU copy 740 is a partial copy, the HFDB 710 includes local-only state information 720, e.g., counters. At stage 2, the network interfaces 500A-N become idle, e.g., receives IEEE 802.3az LPI messages from the network 130. The local-only states 720 of the HFDB 710 that are not stored in the CPU 730 may be either transferred to a CPU 160 at the beginning of the idle period, or powered separately from HFDB states 740, e.g., routing tables or other information for the managing protocols, that are also stored in the CPU 160 depending on an architecture of the switching element 150 and CPU 160. The transfer can occur via the control interface 750.

At stage 3, saving the HFDB states in the CPU 160 allows functions of the switching element 150, e.g., data path 600 and HFDB 710, to be turned off during idle periods, and reduces the idle power consumption to nearly zero. By saving the complete copy of state information in the CPU 740 the switching element 150 can be completely powered down. The powering down can erase the contents of the HFDB 710. The CPU 740 is used to store the essential information of the HFDB 710 while powered down for the period of idleness. In some examples, a soft, local-only state regenerated by switch operation, e.g. MAC tables or other protocols that automatically regenerate the state, need not be saved to the CPU 160.

Figure 5:
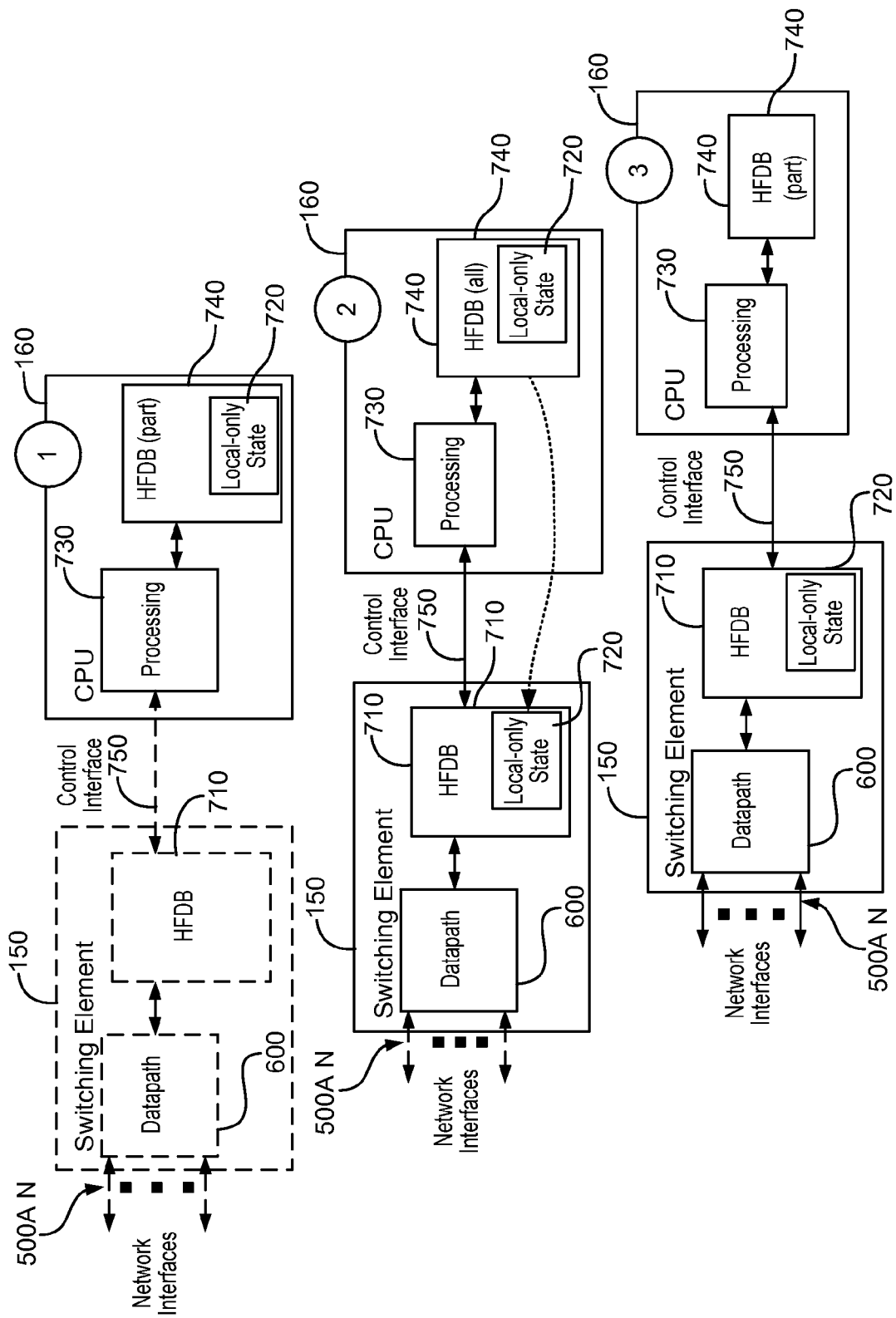
FIG. 5 is a block diagram of an exemplary full power up of the switching element as assisted by the central processing unit.

FIG. 5 is a block diagram of an exemplary full power up of the switching element 150 as assisted by the CPU 160. At stage 1, with the switching element 150 completely powered down the HFDB 710 is erased. In stage 2, the switching element 150 is powered up, e.g., in response to an IEEE 802.3az hold message. When the switching element 150 is powered up the CPU 160 can store the HFDB information 740 to the HFBD 710 of the switching element 150. The CPU 160 can store the entire contents of the HFDB 740 to the switching element 150 or only the essential HFDB information can be restored. Some soft, local-only state, e.g. MAC tables, may not need to be restored. At stage 3, the switching element 150 is active and the CPU 160 can discard switch local-only HFDB data. Storing all essential state information in the CPU 160 during the power-down sequence allows the entire switching element 150 to be powered down.

Figure 6:
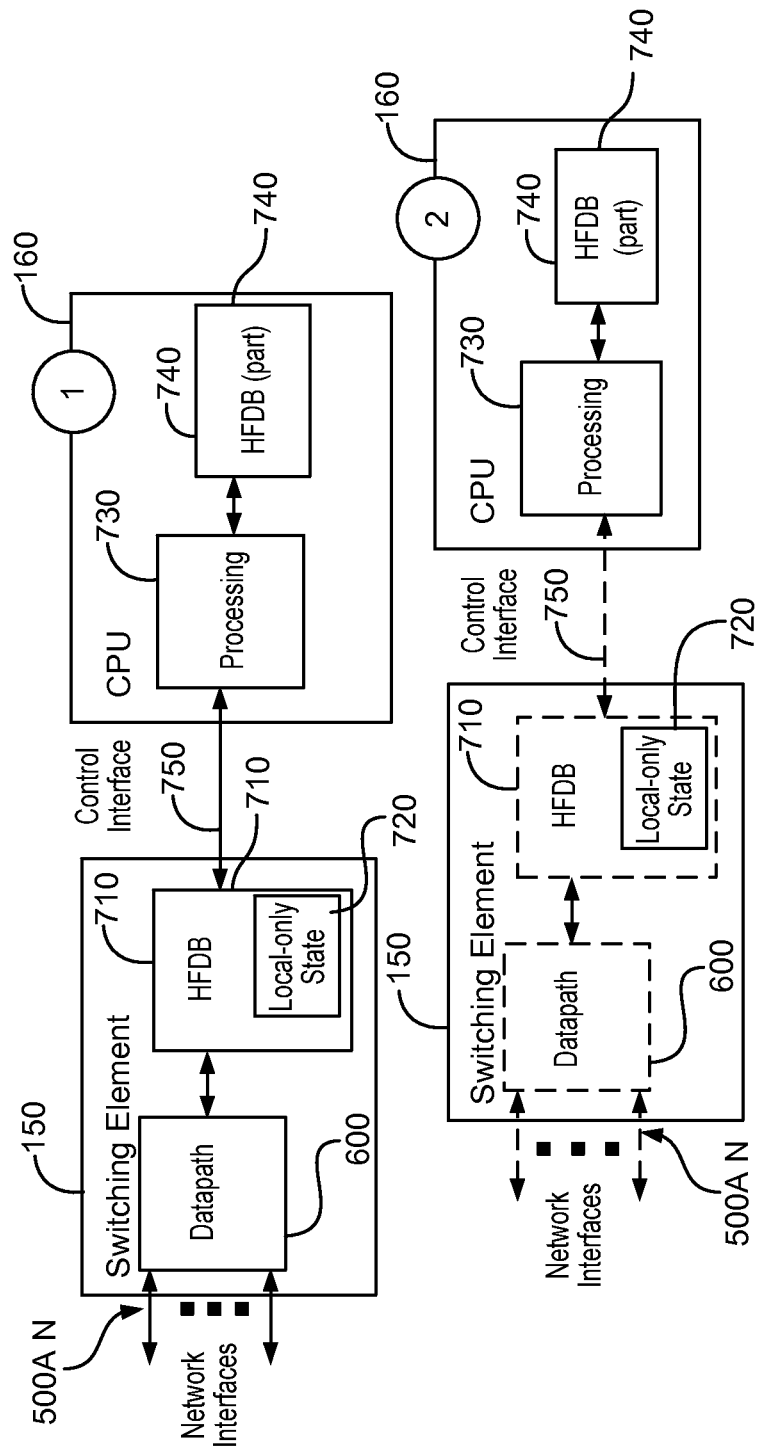
FIG. 6 is a block diagram of an exemplary partial power down of the switching element as assisted by the central processing unit.

FIG. 6 is a block diagram of an exemplary partial power down of the switching element 150 as assisted by the CPU 160. Powering down only the portion of HFDB state that is already duplicated in the CPU 160 during normal operation can allow the switching element 150 to be powered down immediately without any state transfer from the switching element 150 to the CPU 160. The partial power down can reduce the power-down time, thus enabling faster turn-off/turn-on cycle times, which can save power and time, but can increase the idle power consumption.

At stage 1, the switching element 150 is active and the CPU 160 includes a partial, or possibly complete, copy of HFDB 710. At stage 2, the switching element 150 is powered down, except for the local-only state portion 720 that is not presently saved in the CPU 160. Soft, local-only state regenerated by switch operation, e.g. MAC tables, need not be saved. By powering the local-only saved state portion 720 of the HFDB power-off to the switching element 150 can be faster than if the entire HFDB 710 was powered down as no state information is copied to CPU 160.

Figure 7:
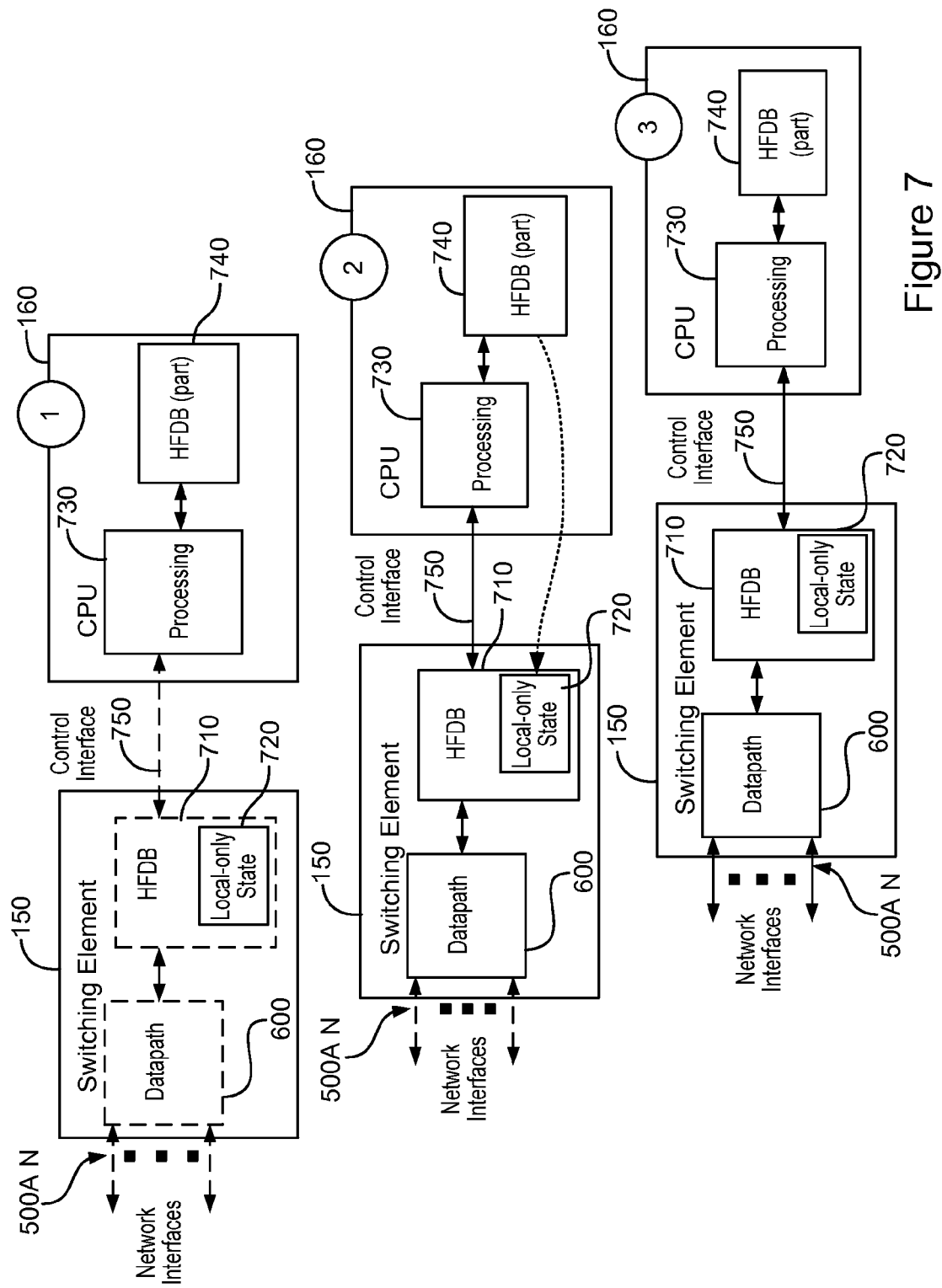
FIG. 7 is a block diagram of an exemplary partial power up of the switching element as assisted by the central processing unit.

FIG. 7 is a block diagram of an exemplary partial power up of the switching element 150 as assisted by the CPU 160. At stage 1, the switching element 150 is currently in a powered down state, except for the local-only state portion 720. At stage 2, the switching element 150 is being powered up, e.g., in response to an IEEE 802.3az hold message. The CPU copy part 740 of HFDB is restored to the switching element 150, e.g., via the control interface 750. At stage 3, the switching element 150 is active and contains a complete version of the HFDB 710.

To detect CPU-assisted full switch power-down, traffic on the CPU to switching element control bus can be observed along with the power consumed by the switching element. When the switching element 150 makes a transition from a power saving mode to an active mode, if the CPU 160 transfers any HFDB data during this transition then the CPU-assisted power down is in use. Power savings technologies that do not save the HFDB in the CPU 160 are only able to save a fraction of the total potential power, because the switching element HFDB remains powered on. Depending on a design of the switching element 150, the power savings from powering down part or all of the HFDB state storage idle power can be reduced to nearly zero.

The solutions can save large amounts of power. If the switching element makes many idle/active transitions, the approach where some switch-local HFDB remains powered in the switch can enable high-speed idle/active transitions saving more power than if the transitions are slower. Another advantage of these techniques is that they can be used together to support full power-down in long idle periods and partial power-down during more active periods when many idle/active transitions are required.

While various embodiments have been described, many more embodiments and implementations are possible. Accordingly, the description is not to be restricted.

What is claimed is:

1. A switching element, comprising:
   a plurality of interfaces connected with a processing pipeline and a packet buffer;
   a clock generator connected with the processing pipeline and the packet buffer, the clock generator configured to operate at a determined speed;
   where the determined speed of the clock generator is adjusted according an operating state of the interfaces; and
   a memory configured to store a hardware forwarding database to store packet forwarding information for packets received at the interfaces, at least a portion of the hardware forwarding database configured to be powered down in accordance with the determined speed of the clock generator being adjusted and the at least a portion of the hardware forwarding database being duplicated in another memory.

2. The switching element of claim 1, where the determined speed of the clock generator is slowed by a proportion of the number of interfaces in the idle state to a total number of the plurality of interfaces.

3. The switching element of claim 1, where the determined speed of the clock generator is slowed by a determined amount in accordance with the number of interfaces being in the idle state.

4. The switching element of claim 1, further including a switch, where the switch turns off power to the processing pipeline and the packet buffer when all of the interfaces are operating in the idle state.

5. The switching element of claim 4, further including a forwarding state that stays powered during the idle state.

6. The switching element of claim 4, where the switch resupplies power to the processing pipeline and the packet buffer when the interfaces receive a wake-up message.

7. A switching system, comprising:
   a switching element including a hardware forwarding database to store packet forwarding information; and
   a central processing unit connected with the switching element, the central processing unit including memory, where the memory stores a partial copy of the packet forwarding information;
   where the hardware forwarding database is powered down when the switching element enters a power-saving state.

8. The switching system of claim 7, where the memory of the central processing unit includes an entire copy of the packet forwarding information and the entire hardware forwarding database is powered down.

9. The switching system of claim 7, where the memory of the central processing unit includes a partial copy of the packet forwarding information and the hardware forwarding database is powered down except for packet forwarding information not stored with the central processing unit.

10. The switching system of claim 9, where state information local to the switching element is not copied to the central processing unit.

11. The switching system of claim 7, where state information stored on the switching element is saved to the central processing unit before the hardware forwarding database is powered down.

12. The switching system of claim 7, where the central processing unit restores the packet forwarding information to the switching element when the switching element is powered back up.

13. The switching system of claim 12, where the restored packet forwarding information does not include media access controller tables.

14. A computer implemented method for reducing power consumed by a switching element, comprising:
   code executed by a processor to perform:
   receiving a status message from a network;
   processing the status message to determine an activity state of the network;

copying at least a portion of a hardware forwarding database of the switching element and adjusting power to a processing pipeline of the switching element based on the determined activity state.

15. The computer implemented method of claim 14, where a power to the processing pipeline is reduced based on a number of ports active on the switching element.

16. The computer implemented method of claim 15, where a frequency of a clock generator is adjusted based on the ports active on the switching element.

17. The computer implemented method of claim 14, where the processing pipeline is powered down.

18. The computer implemented method of claim 14, where the hardware forwarding database is copied to a central processing unit connected with the switching element.

19. The computer implemented method of claim 18, where state information local to the switching element is not copied to the central processing unit.

20. The switching element of claim 1, wherein the idle state of the interfaces is determined for each respective interface based on receipt by the respective interface of an idle message from a network, the idle message being indicative that packets from the network are not presently destined for the respective interface.

\* \* \* \* \*